355-77
5/26/87 S- RE 32,424

United States Patent [19]

Takenaka et al.

[11] E Patent Number: Re. 32,424

[45] Reissued Date of Patent: May 26, 1987

[54] METHOD OF AND APPARATUS FOR DETECTING INITIAL POSITION OF EASEL AND LENS IN PHOTOGRAPHIC APPARATUS

[75] Inventors: Yuji Takenaka; Sumio Yoshikawa, both of Minami-ashigara, Japan

[73] Assignee: Fuji Photo Film Co., Ltd., Japan

[21] Appl. No.: 755,787

[22] Filed: Jul. 17, 1985

Related U.S. Patent Documents

Reissue of:

[64] Patent No.: 4,451,142
Issued: May 29, 1984
Appl. No.: 293,841
Filed: Aug. 18, 1981

[30] Foreign Application Priority Data

Aug 27, 1980 [JP] Japan ..... 55-118116

[51] Int. Cl.[4] ..... G03B 27/52
[52] U.S. Cl. ..... 355/55; 355/77
[58] Field of Search ..... 355/55, 56, 60, 61, 355/77

[56] References Cited

U.S. PATENT DOCUMENTS 3,735,686 5/1973 Brewer et al. ..... 355/56 X
3,785,733 1/1974 Bender ..... 355/61 X
3,832,058 8/1974 Gusovius ..... 355/61 X

*Primary Examiner*—Richard A. Wintercorn
*Attorney, Agent, or Firm*—Gerald J. Ferguson Jr.; Michael P. Hoffman; Ronni S. Malamud

[57] ABSTRACT

In a photographic apparatus for printing an original image on a photosensitive material, focusing is conducted at two different points, and the positions of an easel and a lens at the time of the second focusing are calculated according to the lens formula from the travel amounts of the easel and lens between the first and second focusing positions as well as the focal length of the lens. When the focal length of the lens is unknown, focusing is performed at three points, and the positions of the easel and lens at the time of the third focusing are determined with the lens formula. Pulse motors used to move the easel and lens are controlled by a microcomputer, which adds the number of pulses for forward rotation of the pulse motor and subtracts that for backward rotation. The microcomputer counts and stores the number of pulses indicative of the present positions of the easel and lens. Their initial positions are detected based on the second focusing positions for checking the standard mounting positions of the detectors for the easel and lens. The mounting positions of these detectors are stored in the microcomputer as the standard positions for use in the compensation for step out.

3 Claims, 7 Drawing Figures

METHOD OF AND APPARATUS FOR DETECTING INITIAL POSITION OF EASEL AND LENS IN PHOTOGRAPHIC APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a photographic system used for printing an original image on a photosensitive material such as enlarger, process camera, copying camera, etc. and more particularly to a method of and apparatus for detecting the initial positions of an easel and a lens wherein focusing operations are performed at two or three different positions to determine the initial positions of the easel and the lens.

2. Description of the Prior Art

Conventional photographic apparatus such as enlargers are designed so that an easel holding a photosensitive material and a lens can move vertically along a stay. When the easel is set in a desired position, the lens travels automatically to a position determined by the lens formula to focus an image on the photosensitive material in the easel. In one type of such focusing systems, a cam mechanism interlocked with the easel is provided to move the lens to a required position according to the position of the easel. In another type of such systems, a microcomputer is used to calculate the required position of the lens, and the lens is moved to the position by use of a servomotor by measuring the lens positions with a potentiometer.

With such conventional systems, an extreme caution must be paid not only to the accuracy of the cam mechanism and the potentiometer but also to be mounting positions thereof. This is because the lens and the easel are moved while the current positions thereof are measured with the cam mechanism and the potentiometer. In addition, the easel is considerably heavy and the stay for guiding the easel may be deformed during transportation due to the weight of the easel. In this case, extremely troublesome adjustments are required for the cam mechanism and the potentiometer.

To solve such a problem, a pulse motor may be used as a drive source to travel the easel and the lens, and the current positions of the easel and the lens may be detected by integrating the number of pulses that have been input to the pulse motor. However, when using a system in which a pulse motor is used and the positions of the easel and the lens are detected based on the number of pulses input to the pulse motor, it is necessary to specify the initial positions of the easel and the lens. For this purpose, indicators or the like may be mounted on the stay to indicate the initial positions of the easel and the lens. However, this method using indicators or the like involves the same disadvantages as those encountered in the conventional enlargers described above.

Moreover, with the method wherein the initial positions of the lens and of the easel are specified by a mechanical means, the position of the principal point of the lens must be corrected when the lens has been replaced with a new one. This is because the distance between the lens mounting plane and the position of the principal point of the lens alters due to the lens replacement.

SUMMARY OF THE INVENTION

The object of the present invention is to provide a method of an apparatus for detecting the initial positions of the lens and the easel, which can correctly detect such initial positions and can eliminate the disadvantages of the conventional systems as described above.

Another object of the present invention is to provide a method of and apparatus for detecting the initial positions of the lens and the easel, which can determine such initial positions even when the position of the principal point of the lens is unknown.

The present invention is distinguished by the fact that focusing is carried out at two different points, and that the positions of the easel and the lens which are located at the positions (i.e., initial positions) where the second focusing is conducted are calculated by use of the lens formula from the travel amounts of the easel and the lens between the first focusing positions and the second focusing positions, and from the focal length of the lens.

In case the focal length of the lens is unknown, focusing is carried out at three different points, and the positions of the easel and the lens which are located at the positions where the third focusing is conducted can be determined by use of the lens formula.

In a system for conducting the above-mentioned method according to the present invention, pulse motors are used to move the easel and the lens. The pulse motors are controlled by a microcomputer, which adds the number of pulses for forward rotation of the pulse motors and subtracts that for backward rotation thereof. Thus the microcomputer counts and stores the number of pulses that are indicative of the current positions of the easel and the lens. The initial positions of the easel and the lens are detected based on the second focusing operation and are used for inventigating the standard mounting positions of the detectors for the easel and the lens. These standard mounting positions of the detectors are stored in the aforesaid microcomputer as the standard positions for step out compensation.

DESCRIPTION OF THE PREFERRED EMBODIMENTS

Now the present invention will be described in detail with reference to the drawings.

Figure 1:
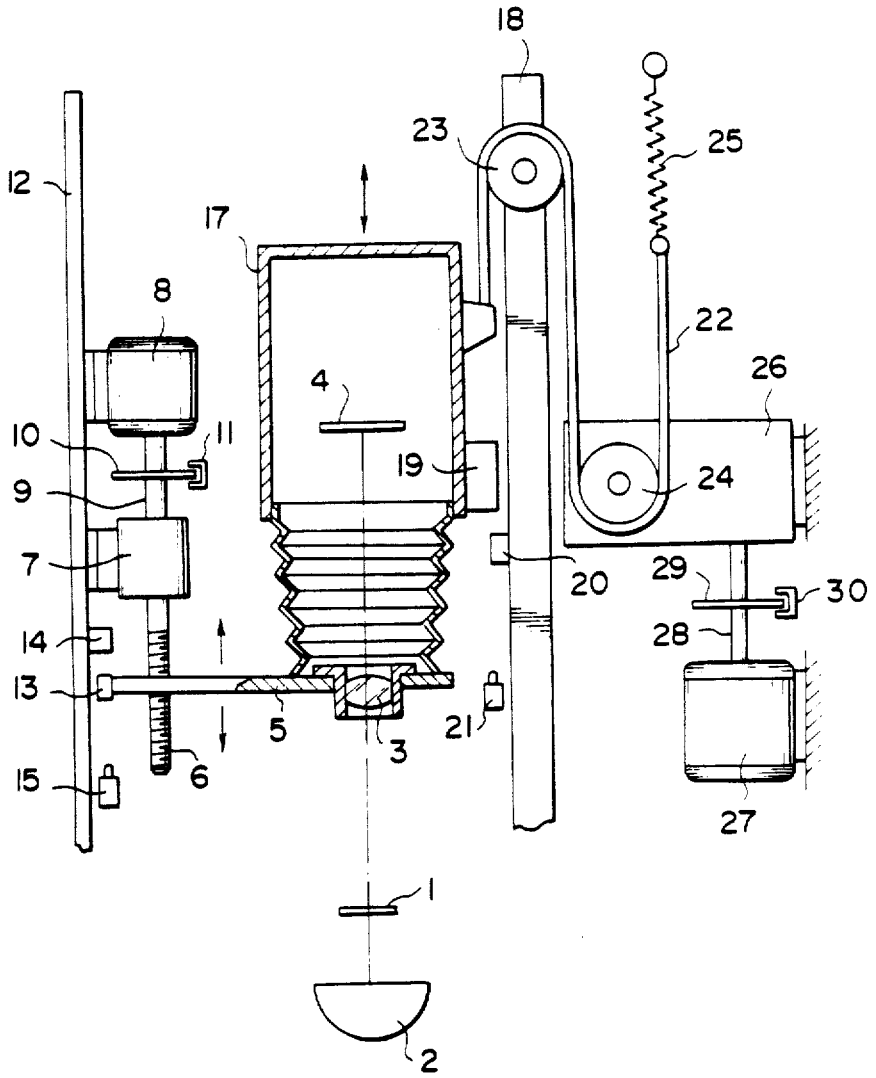
FIG. 1 is a schematic view showing an enlarger according to the present invention.

Referring to FIG. 1, an original 1 such as a negative film is illuminated by a light source 2 which is located below the original 1. An image recorded in the original 1 is projected on a photosensitive material 4 through a lens 3.

The lens 3 is mounted on a lens holder plate 5 a part of which engages with a feed screw 6. The feed screw 6 is mounted on the output side of a speed reducer 7, which is in turn connected with an output shaft 9 of a pulse motor 8 for lens. On the output shaft 9 is mounted a rotating plate 10 whose rotational position is detected by a photocoupler 11.

Figure 2:
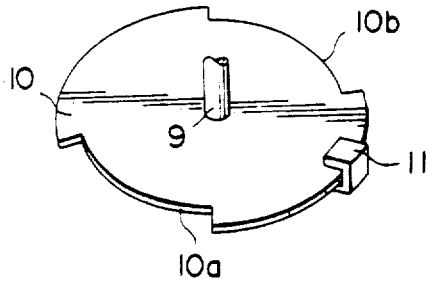
FIG. 2 is a perpective view of the rotational position detector used according to the present invention.

Referring to FIG. 2, notches 10a and 10b are formed at two positions in the rotating plate 10. These notches 10a and 10b range over 90° along the periphery of the plate 10 and are 180° spaced apart from each other.

Figure 3:
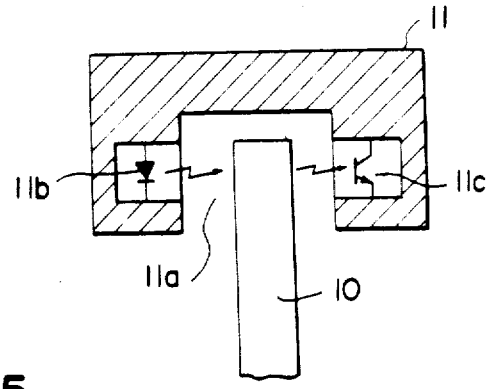
FIG. 3 is a cross-sectional view of the photocoupler used according to the present invention.

As shown in FIG. 3, a light source section 11b and a light receiving section 11c of the photocoupler 11 are positioned on both sides of a recess 11a through which the periphery of the rotating plate 10 passes while rotating to detect the existence of notches 10a and 10b of the rotating plate 10.

The above-described pulse motor 8 for lens rotates in both forward and backward directions to vertically move the lens holder plate 5 along a stay 12. On the lens holder plate 5, a light shielding plate 13 is mounted to open and close the light path in a photocoupler 14 which is located at a predetermined position, thereby making it possible to detect that the lens 3 reaches the standard position. This photocoupler 14 may be of the same type as that shown in FIG. 3. A microswitch 15 detects the lens 3 reaching the lower limit position thereof and stops the rotation of the pulse motor 8 for lens.

The aforesaid photosensitive material 4 is retained in an easel 17 and travels up and down along the stay 18. The standard position of the easel 17 is detected by a combination of a light shielding plate 19 and a photocoupler 20. A microswitch 21 detects that the easel 17 reaching the lower limit position thereof.

The above-mentioned easel 17 is connected with one end of the chain 22, which moves the easel 17 vertically. The chain 2 engages with sprocket gears 23 and 24, and the other end thereof is connected to a return spring 25. The sprocket gear 24 is mounted on a speed reducer 26 and driven by a pulse motor 27 for easel. On the output shaft 28 of the easel pulse motor 27 is mounted a rotating plate 29, which may be of the same type as that shown in FIG. 2. The existence of the notches of the plate 29 is detected by a photocoupler 30.

Figure 4:
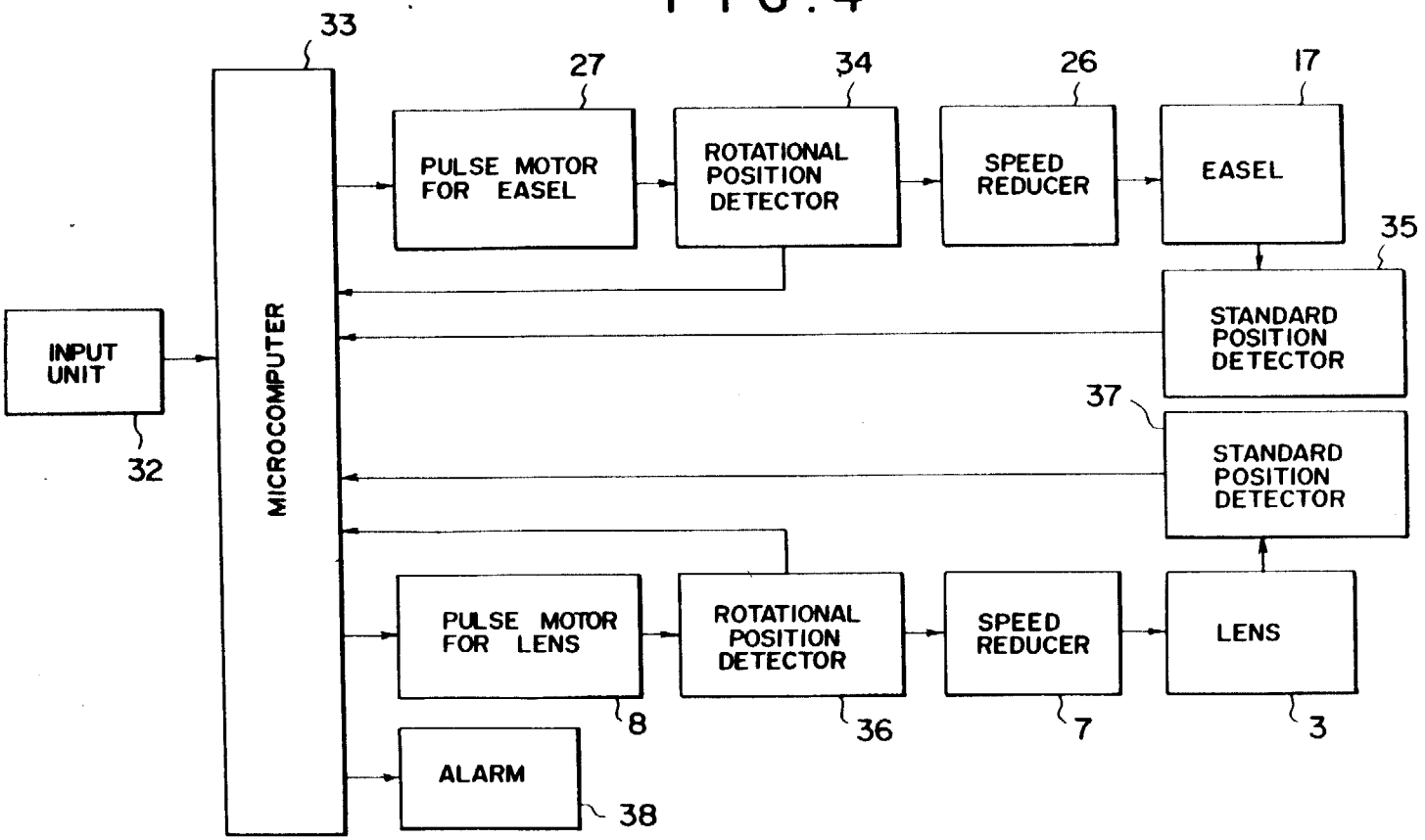
FIG. 4 is a block diagram of the control circuit used according to the present invention.

Referring to FIG. 4 showing a block diagram of a control circuit, an input unit 32 has various operation keys. The signals input thereby are sent to a microcomputer 33. The microcomputer 33 sends pulse signals to the pulse motor 27 for easel and the pulse motor 8 for lens and rotates the same. The rotational position of the easel pulse motor 27 is detected by a rotational position detector 34 which consists of the rotating plate 29 and the photocoupler 30. Further, the standard position of the easel 17 is detected by a standard position detector 35 which consists of the light shielding plate 19 and the photocoupler 20. These position detectors are of optical type using photocouplers. However, they may be of electrical type detecting the positions by use of magnets, etc.

The rotational position of the aforesaid pulse motor 8 for lens is detected by a rotational position detector 36 which consists of the rotating plate 10 and the photocoupler 11. Further, the standard position of the lens 3 is detected by a standard position detector 37 consisting of the light shielding plate 13 and the photocoupler 14. An alarm 38 gives a warning signal when step out (deviation of synchronization) occurs with the pulse motor 27 for easel or pulse motor 8 for lens.

Figure 5:
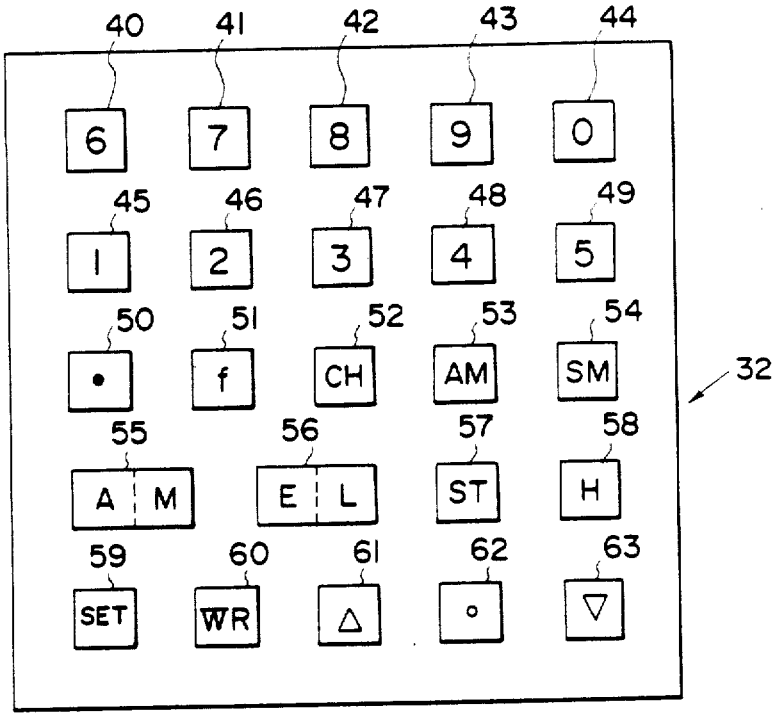
FIG. 5 is a plan view of the operation keys used according to the present invention.

Referring to FIG. 5 showing an input unit of the microcomputer, reference characters 40 through 49 denote ten keys, and 50 denotes a decimal point key. Reference character 51 denotes a focal length input key, and 52 a channel key used to enlarge various sizes of negative films to a desired printing size. Reference characters 53 and 54 designate input keys for specifying the auto mode and the set mode, respectively, while 55 designates an auto-manual selector key. Reference character 56 shows an input key to selectively change over the travel of the easel and the lens, and 57 a start key. Reference character 58 shows a home key for setting the magnification to the "standard magnification" of each channel, and 59 a position input key. Reference character 60 designates a write key, and 61 through 63 travel keys for the lens 3 and the easel 17.

Now the operations of the present invention with the aforesaid composition will be explained below.

First, the set mode key 54 is depressed to select the set mode, which is used to determine the initial positions of the easel 17 and the lens 3. Then, the key 51 is depressed, and the ten keys 40 through 49 as well as the decimal point key 50 are depressed to designate the focal length (f-value) of the lens 3. Finally, the write key 60 is depressed to write data in a memory of the microcomputer 33.

After the f-value of the lens 3 is input, the auto-manual selector key 55 is depressed to select the manual mode. Then, the easel-lens selector key 56 is set to the easel side.

When the up key 61 is depressed, the pulse signal for forward rotation is output from the microcomputer 33 to the easel pulse motor 27, and the easel 17 moves upward. When the down key 63 is depressed, the pulse signal for backward rotation is output from the microcomputer 33, and the easel pulse motor 27 rotates backward to move the easel 17 downward. The key 62 makes the easel 17 travel step by step in the direction determined by the up key 61 or the down key 63.

By operating these keys 61 through 63, the easel 17 is caused to travel to a desired position. In this case, it is preferable that the two points where focusing is carried out are spaced apart from each other as far as possible. Therefore, the easel 17 is moved to the lower limit position thereof by use of the down key 63.

Then, the easel-lens selector key 56 is set to the lens side, and the lens is moved to a position where the image is focused by use of the keys 61 through 63. The position where the image is focused can be found by looking in the easel 17 and finding out a position where the image seems to be focused, printing while moving the lens in the vicinity of that position, and finding out the sharpest photograph among the photographs thus obtained. The lens 3 is then returned to the position where the sharpest photograph was printed.

After carrying out the first focusing described above, the position input key 59 is depressed and the number of pulses stored in the microcomputer 33 is cleared. That is, the microcomputer 33 adds the number of the pulse signals for the forward rotation of the pulse motor, among the pulse signals input to the pulse motor, and subtracts the number of the pulse signals for the backward rotation of the pulse motor. In this way, the microcomputer 33 controls the current position of the easel 17 and the lens 3 by means of the number of pulses calculated through the addition and subtraction. Therefore, the travel amounts (i.e., number of pulses) of the easel 17 and the lens 3, which have travelled to the first focusing position, have been stored in the microcomputer 33. The number of pulses stored is cleared by use of the aforesaid position input key 59.

The easel 17 is travelled to the upper limit position thereof, where the second focusing is carried out. At this point of time, the travel amounts of the easel and the lens with reference to the first focusing positions become apparent. After this second focusing is completed, the start key 57 is depressed, and the calculation is conducted on the basis of the lens formula to determine the current position (i.e., initial position) of the easel 17 and the lens 3.

Figure 6:
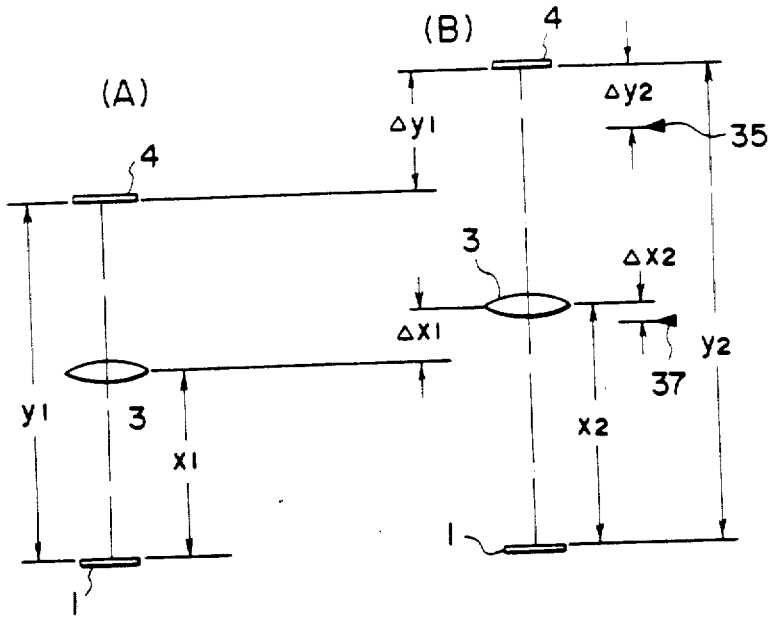
FIG. 6 is an explanatory view showing the positions of the lens and the easel when the first and second focusing operations are carried out.

Diagram (A) in FIG. 6 shows the position of the lens 3 and the photosensitive material 4 when the first focusing is carried out. The position of the photosensitive material 4 is equivalent to that of the easel 17.

From the lens formula, the following is established:

$$1/x1+1/(y1-x1)=1/f \ldots \quad (1)$$

wherein f is the number of pulses corresponding to the focal length of the lens, x1 is the number of pulses corresponding to the distance between the original and the lens, and y1 is the number of pulses corresponding to the distance between the original and the photosensitive material.

In Equation (1) above, the number of pulses is used for each of x1, y1 and f. Therefore, conversion calculations are necessary when the travel amounts of the easel 17 and the lens 3 per unit pulse are different.

Diagram (B) in FIG. 6 shows the position of the lens 3 and the photosensitive material 4 when the second focusing is carried out. In this case, the following equation holds:

$$1/x2+1/(y2-x2)=1/f \ldots \quad (2)$$

Now the number of pulses required for the travel from the first focusing position to the second focusing position is represented by $\Delta x1$ for the lens 3 and $\Delta y1$ for the photosensitive material 4. When using $\Delta x1$ and $\Delta y1$, Equation (1) can be described as follows $$1/(x2-\Delta x1)+1/(y2-x2-\Delta y1)=1/f \ldots \quad (3)$$

Values $\Delta x1$, $\Delta y1$ and f are known. Therefore, the initial positions x2 and y2 can be determined by solving the simultaneous equations, i.e. Equations (2) and (3).

Thereafter, the easel 17 and the lens 3 are made to travel to the positions of the standard position detectors 35 and 37, respectively. When the amounts of these travels are $\Delta y2$ and $\Delta x2$, the standard position of the easel 17 is $(y2-\Delta y2)$, and that of the lens 3 is $(x2-\Delta x2)$. These standard positions are stored in the nonvolatile memory of the microcomputer 33.

The lens position described above is the position of the principal point of the lens. Accordingly, the aforesaid operations are carried out for each lens, and the value of the standard position of each lens is stored. When the lens is changed, it is sufficient to designate the type of the new lens.

After performing the aforesaid setting operations, the auto mode key 53 is depressed to select the auto mode. In the auto mode, the easel 17 travels when the keys 61 through 63 are depressed. The number of pulses corresponding to the position of the easel 17 during the travel is already known. Therefore, when the easel 17 travels, the microcomputer 33 calculates the position of the lens 3 based on the lens formula, and outputs the number of pulses necessary to move the lens 3 to the calculated position. Thus the lens pulse motor 8 rotates, and the lens 3 travels in a manner following up the travel of the easel 17, thereby to accomplish focusing automatically.

Further, when the channel key 52 and the ten keys 40 through 49 are operated sequentially to designate a channel (e.g. CH2), the lens 3 and the easel 17 are automatically set to the positions necessary to enlarge a given size of an original to the desired size.

As described above, the current positions of the easel 17 and the lens 3 are checked in terms of the number of pulses sent to the pulse motors 8 and 27 for moving the easel 17 and the lens 3. Therefore, a focus mismatching will occur when the value stored in the microcomputer 33 does not coincide with the rotation amount of the easel pulse motor 27 or lens pulse motor 8 (i.e., when step out occurs).

Figure 7:
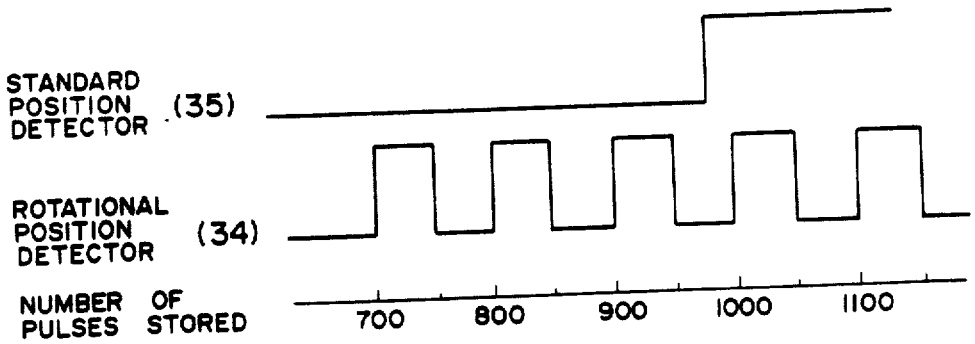
FIG. 7 is a graphical representation showing the relationship between the outputs of the position detectors and the number of pulses stored in the microcomputer.

Such a step out can be checked by using the number of pulses stored in the microcomputer 33 and the position signals of the rotational position detectors 34 and 36. For example, the rotary plate 29 of the position detector 34 has the notches 10a and 10b at intervals of 50 pulses, and rotates 360° with 200 pulses. As shown in FIG. 7, therefore, the photocoupler 30 outputs the position signal whose level is inverted at intervals of 50 pulses. Thus, whether the number of pulses stored changes by 50 or not may be checked when the output level of the photocoupler 30 is inverted. For example, if the system is set so that the position signal is inverted when the number of pulses stored is zero, the number of pulses stored must always be an integral number of multiples of 50.

Accordingly, during the rotation of the easel pulse motor 27, it can be found that step out is not occurring if the number of pulses stored is an integral number of multiples of 50 when the output of the photocoupler 30 is inverted. If the number of pulses stored is e.g. 403 or 398 at that point of time, it follows that step out is occurring. In case the number of pulses stored is 403, 3 is subtracted from the number of pulses stored, or three pulse signals for forward rotation are sent to the easel pulse motor 27, whereby the step out is corrected. In case such a number is 398, 2 is added to the number of pulses stored, or the easel pulse motor 27 is rotated backward appropriately.

A program for detecting the step out is incorporated in the microcomputer 33, and such detection is carried out each time the output of the photocoupler 30 is inverted. In case the degree of step out is high, e.g. 10 pulses or more, the alarm 38 is alerted. In such a case, the easel 17 is travelled to the position of the standard position detector 35. Then, the number of pulses stored for the easel 17 is corrected to the previously stored number of pulses for the standard position when the output of the photocoupler 30 of the rotational position detector 34 is inverted to the high level after the output of the photocoupler 20 of the standard position detector 35 is inverted to the high level.

As described above, a combination of the standard position detector 35 with the rotational position detector 34 is used. This is because the travel amount of the easel 17 per pulse is extremely small (e.g. 8/200 mm), so that the accuracy of the positional detection is low. On the other hand, the rotational position detector 34 can correctly detect the travel amount per pulse. Therefore, the standard position is designated by use of both position detectors 34 and 35, and a correction is made with this standard position.

In the same way, the step of the lens pulse motor 8 can be compensated for and corrected with the use of the rotational position detector 36 and the standard position detector 37.

In the above embodiment, the f-value of the lens is known in advance. In case the f-value is unknown, the focusing is carried out in three different positions, and three equations are created. Thus initial positions of the lens and the easel can be determined by solving the simultaneous equations.

With the aforesaid composition according to the present invention, the focusing is conducted at two or three different points, and the initial positions of the lens and the easel are determined by use of the lens formula. Therefore, the present invention provides a higher accuracy than the conventional methods in which the initial positions are determined with a mechanical means. That is, with the method in which the initial positions are determined mechanically, an error occurs with reference to the actual value when the mounting positions of indicators, etc. for indicating the initial positions become inadequate or when the stay is deformed. Such a problem does not arise with the present invention.

Further, according to the present invention, the initial position of the easel and the lens can be determined even when the position of the principal point of the lens is unknown.

In addition, in the present invention, the easel and the lens are made to travel by use of pulse motors, and the position of the easel and the lens is determined by the number of pulses that have been input into the pulse motors. Thus, the present invention can eliminate the need for using potentiometers or the like to measure the current positions of the easel and the lens. (Of course, it is also possible to use additional detectors such as potentiometers and rotary encoders).

Furthermore, the standard position detectors that can determine the position according to the lens formula are installed whereby, when the step out occurs with the pulse motors, the step out can easily be corrected by returning the easel and the lens to the standard positions.

We claim:

1. In a photographic system for printing an image of an original on a photosensitive material, a method of detecting the initial positions of an easel and a lens comprising carrying out the first focusing by moving an easel and a lens the focal length of which is known in advance, to find out a position where the image seems to be focused by looking in the easel, and placing a photosensitive material in the easel, printing while moving the lens in the vicinity of the position, and finding out the sharpest photograph among the photographs obtained, and carrying out the second focusing by moving the easel and the lens in the same manner at a different position, and determining the positions of the easel and the lens with respect to the original at the second focusing according to the lens formula by use of the travel amounts of the easel and the lens from the first focusing position to the second focusing position.

2. In a photographic system for printing an image of an original on a photosensitive material, a method of detecting the initial positions of an easel and a lens comprising carrying out focusing three times at different positions of a lens and an easel, by moving an easel and a lens [the focal length of which is known in advance], to find out a position where the image seems to be focused by looking in the easel, and placing a photosensitive material in the easel, printing while moving the lens in the vicinity of the position, and finding out the sharpest photograph among the photographs obtained at each position, and determining the positions of the easel and the lens with respect to the original at the third focusing according to the lens formula by use of the travel amounts of the easel and the lens from the first focusing position to the second focusing position, and the travel amounts of the easel and the lens from the first focusing position to the third focusing position.

3. In a photographic system for printing an image of an original on a photosensitive material, an apparatus for detecting the positions of an easel and a lens comprising an easel pulse motor for moving an easel holding a photosensitive material therein, a lens pulse motor for moving a lens, a microcomputer which calculates the initial positions of the easel and the lens with respect to the original at the second focusing according to the lens formula by use of the number of pulses required to move the easel and the lens from the first focusing position to the second focusing position, wherein each focusing is carried out by moving the easel and the lens to find out a position where the image seems to be focused by looking in the easel, and placing a photosensitive material in the easel, printing while moving the lens in vicinity of the position, and finding out the sharpest photograph among the photographs obtained, and the focal length of the lens and adds the number of pulses for the forward rotation of the pulse motor and subtracts the number of pulses for the backward rotation of the pulse motor out of the pulses sent to the pulse motors to store the calculated values, and standard position detectors for the easel and the lens have reached specified positions and allow said microcomputer to calculate said specified positions by adding to or subtracting from the number of pulses corresponding to the initial positions where the second focusing is carried out, the number of pulses required for moving the easel and the lens from said initial positions to said respective specified positions, thereby to store the calculated positions as the standard positions.

* * * * *